April 12, 1960

W. T. O'NEIL 2,932,812

TRAFFIC ANALYZER

Filed Feb. 24, 1956

INVENTOR.
WILLIAM T. O'NEIL

BY
Thomas J Kendrick
ATTORNEY

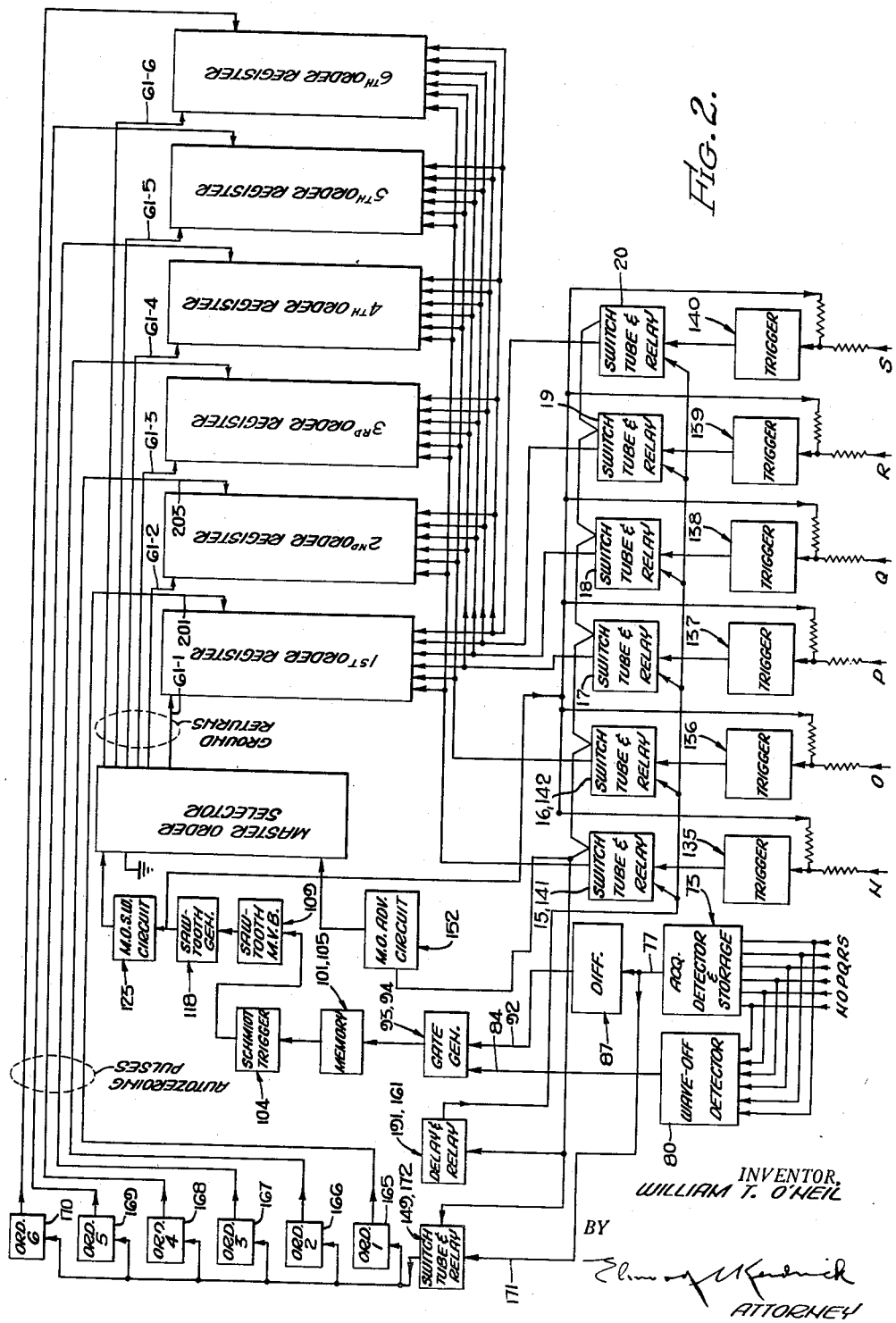

April 12, 1960  W. T. O'NEIL  2,932,812
TRAFFIC ANALYZER
Filed Feb. 24, 1956
9 Sheets-Sheet 7

INVENTOR,
WILLIAM T. O'NEIL
BY
Edmond L Kendrick
ATTORNEY

United States Patent Office 2,932,812
Patented Apr. 12, 1960

2,932,812

TRAFFIC ANALYZER

William T. O'Neil, La Crescenta, Calif., assignor to Gilfillan Bros., Inc., Los Angeles, Calif., a corporation of California Application February 24, 1956, Serial No. 567,498

25 Claims. (Cl. 340—23)

This invention relates to track-while-scan ground controlled approach (GCA) system and more particularly to means for simultaneously monitoring the descent of a plurality of aircraft along the ideal glidepath of such a system.

This application is a continuation-in-part of copending application Serial No. 476,467, entitled "Traffic Analyzer," filed December 20, 1954 now abandoned, by William T. O'Neil.

In the past, GCA monitoring systems normally have incorporated range indicators to produce a display of the ranges of all aircraft being guided by the associated GCA system. Among other reasons, this display is provided to monitor the descent of an aircraft and thereby to detect any dangerous maneuvers thereof which may constitute a hazard. In order that such a hazard may be removed ideally, an arrangement should be provided to affect selective communication to the aircraft causing the hazard. That is, means should be provided to communicate with the pilot of a particular hazard aircraft to warn him and/or give him instructions. Alternatively, means might be provided to exclude the hazard aircraft from guidance. It is thus desirable that selective communication be simply affected rather than effected although no convenient method has, to the present time, been devised for this purpose.

The present invention overcomes this and other problems of the prior art by providing at least one manually operable switch identifiable with each of a plurality of tracking channels in a track-while-scan GCA system. By actuation of these switches, a monitoring system operator is permitted to communicate with any selected aircraft guided by the GSA system. If no indication were produced with the range indicator display to identify each aircraft with a particular tracking channel to which each is assigned, the monitoring system operator would be required to actuate the communication switches at random until he could communicate with a particular aircraft causing a hazard to exist. For this reason, means are accordingly provided in accordance with the present invention for producing visual representation identifying each tracking channel in the landing order of aircraft assigned thereto. The range indicator naturally provides aircraft range indications and thereby the landing order of aircraft. Since the communication switches are only identifiable with particular tracking channels, the means providing channel landing order or priority identification correlates the relative range indication of a hazard aircraft on the range indicator with a particular tracking channel so that communication with the hazard aircraft may be selectively affected and a change in guidance thereof may be effected to remove the hazard caused by the aircraft.

In order to monitor the descent of aircraft in accordance with the present invention, a monitoring system operator watches the range indicator. When he detects a hazard being caused by a particular aircraft, he may determine the landing order of the hazard aircraft on the range indicator merely by counting the number of aircraft between the hazard aircraft and touchdown, i.e. where aircraft are guided to land. By comparing this landing order with the visual representations on the channel priority identification means, the identity of the particular tracking channel to which the hazard aircraft is assigned may be determined. Then a corresponding communication switch may be operated to automatically or manually eliminate or initiate guidance of the hazard aircraft, or to change the guidance thereof as the case may require. Alternatively, the pilot of the hazard aircraft may be warned by visual display transmitted from GCA landing station to him or by vocal communication with him.

According to a specific feature of the invention the channel priority identification means includes a bank or matrix of sensible means or indicator lamps with a number of both rows and columns corresponding to the total number of tracking channels in the associated GCA system. The rows may, for example, be employed to represent different tracking channels and the columns may be employed to represent the landing order of aircraft. Means are then employed to incandesce only one lamp in each row and column. A lighted lamp then denotes both the landing order of an aircraft and identifies the tracking channel to which it is assigned.

According to this same feature of the invention, a communication switch is disposed in visual correspondence to each row of the indicator lamp. For example, each communication switch may be disposed in line with each row of indicator lamps. With this arrangement a switch affecting communication to an aircraft of a known landing priority may be quickly found by determining the row in which an indicator lamp is lit for that particular known priority or landing order.

According to another aspect of the invention, a novel device is provided for operating the channel priority lamp matrix. This device may, in addition, be useful in a number of other applications because, essentially, its function is simply to produce a plurality of identification signals successively in an order corresponding to the magnitude of a common variable characteristic of a plurality of corresponding input signals. In relation to the monitoring system of the invention, input signals are amplitude varying D.C. signals representative of the ranges of aircraft guided by the associated GCA system. These input signals are conveniently provided on separate input leads because of the inherent operational mode of the range tracking channels of a track-while-scan radar system. Should the input signals be pulse amplitude, pulse width or pulse time modulated or be phase, frequency, or amplitude modulated A.C. signals, the device of the present invention will operate equally as well to produce identification signals in an order corresponding to the common variable characteristic of the input signals, viz. the amount of modulation of each.

According to the invention the device employed to produce these identification signals comprises means for generating a comparison signal having the same common variable characteristic changing from one to the other of predetermined limits, and means for generating an identification signal for each of the input signals each time the common variable characteristic magnitude of the comparison signal becomes equal to that of each corresponding input signal. In the particular application of this device to the lamp matrix, a plurality of order registers are employed to provide selectively electrical paths to the lamps of the matrix. Each order register corresponds to a particular column, i.e. if columns are employed to denote the landing order of aircraft. Each order register is then operated by the identification signals but always in the same succession regardless of which identification signal is generated first. The order registers, however, are also operated to provide an electrical path to only a single lamp in a corresponding column and only in the row corresponding to the particular tracking channel and input signal for which an identification signal is produced.

The order registers are preferably not operated continually since it is only necessary to register a different landing order when the air traffic situation changes. For this reason, means are provided in accordance with the invention to zero and reoperate at the order registers only when the traffic situation does change, for example, when an aircraft is initially guided or excluded from guidance in the associated GCA system.

It is therefore an object of the invention to provide means for monitoring the descent of a plurality of aircraft along the ideal glidepath of a ground controlled approach system.

Another object of the invention is to provide means for quickly determining the channel of a track-while-scan radar system tracking the range of an aircraft causing a hazard to others by a dangerous maneuver.

It is still another object of the invention to provide means for expeditiously affecting selective communication with and/or affecting selectively a change in guidance of an aircraft constituting a hazard in a GCA system.

A further object of the invention is to provide means for correlating the tracking channel of an aircraft with its landing order in a track-while-scan GCA system.

A still further object of the invention is to provide a device for producing a plurality of identification signals successively in an order corresponding to the magnitudes of a common variable characteristic of a plurality of input signals.

Yet another object of the invention is to provide means responsive only to changes in traffic conditions for zeroing devices registering the identities of a plurality of tracking channels in a track-while-scan GCA system in the landing order of aircraft assigned thereto.

Still another object of the invention is to provide means responsive to changes in traffic conditions for initiating the identification of the landing order of a plurality of aircraft in a track-while-scan GCA system with the particular tracking channels to which aircraft are assigned.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Fig. 2 is a block diagram of one feature of the present invention;

Figure 1:
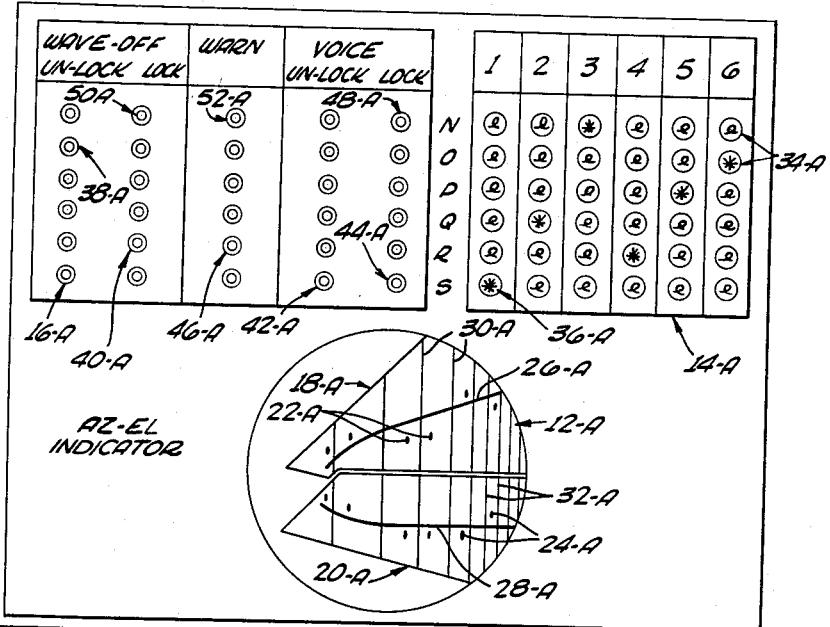
Fig. 1 is a front view of a panel display of the monitoring system of the present invention.

In the drawings in Fig. 1 a panel 10-A containing inserts 12-A, 14-A and 16-A representing respectively a range indicator, a lamp matrix and a matrix of communication switches is shown. The range indicator 12-A may be any type of range indicator. The range indicator 12-A, however, as shown is of the type described in copending application Serial No. 398,288, entitled "Automatic Ground Controlled Approach Systems," filed December 15, 1953, by Homer G. Tasker et al. The indicator 12-A may be a cathode-ray tube having appropriate circuitry to trace an elevation sector 18-A and an azimuth sector 20-A thereon on a time shared basis. A plurality of target spots 22-A are disposed in the elevation sector 18-A to show the range of aircraft in a GCA system as a function of the elevation of the aircraft. Target spots 24-A in the azimuth sector 20-A are employed to graphically represent the range position of aircraft in the system as a function of azimuth. The lines 26-A and 28-A are respectively the ideal glidepaths of aircraft in the system as a function of elevation and azimuth. The vertical lines 30-A and 32-A in the elevation and azimuth sectors 18-A and 20-A are respectively employed to indicate equal range marks, the horizontal display being a logarithmic function to space aircraft closest to touchdown away from adjacent aircraft so that examination may be made of the relative positions of aircraft about to land, i.e. those primarily of interest.

The lamp matrix 14-A consists of a bank of lamps 34-A arranged in an equal number of rows and columns. Arbitrarily the columns rather than the rows have been selected to represent the landing order of aircraft, the left hand column being representative of the aircraft next to land. Only the lamp 34-A is lit in both each column and each row. For example, a lamp 36-A is lit in the first column and in the last row, designated as row S. No other lamp 34-A is lit in the column 1 or the row S.

Five columns of pushbuttons are located in the panel insert 16-A. The first column 38-A contains push-buttons corresponding to the respective rows of lamps 34-A to unlock respective wave-off pushbuttons 40-A when an aircraft is waved-off, i.e. when an aircraft is manually excluded from guidance in the associated GCA system. Similarly an unlock column of pushbuttons 42-A are provided in the fourth row from the left to unlock a plurality of voice pushbuttons 44-A which may be employed for voice communication to aircraft corresponding to a plurality of tracking channels N, O, P, Q, R, S. A single middle row of pushbuttons 46-A are momentary contact pushbuttons which may be employed to warn a pilot of an aircraft assigned to a particular tracking channel that his position is hazardous to both his aircraft and aircraft near him. For example, a warning light may be displayed upon the instrument panel of an aircraft assigned to a particular channel. By virtue of the fact that the pushbuttons in the panel insert 16-A are in visual correspondence to the rows of the indicator lamps 34-A, selective communication may be made to any aircraft, the priority or landing order of which is known.

The monitoring system of the present invention may be usefully employed in the following manner. A monitoring system operator may observe the indicator 12-A to detect a dangerous maneuver of a particular aircraft. For example, if the aircraft represented by the third spot from the left in the elevation sector 18-A may be too close to the altitude or range of a spot corresponding to a preceding or subsequent aircraft. The monitoring system operator may observe the third column in the lamp matrix 14-A and find that the lamp 34-A in the first row N is lit in the third column. This automatically tells the operator that to warn, to give instructions to, or to change the guidance of the aircraft assigned to the tracking channel N. A switch corresponding to a button in the row N must then be operated. For example, if the operator wishes to communicate by voice with the pilot of the aircraft assigned to the tracking channel N, the monitoring system operator may push the particular "lock" voice pushbutton 48–A in the column 44–A. If the operator wishes to exclude the aircraft assigned to the channel N from guidance in the system, the pushbutton 50–A in the column 40–A may be operated. Again if the monitoring system operator only wishes to warn the pilot of the aircraft assigned to the tracking channel N that he is in a dangerous position, momentarily the pushbutton 52–A in the column 46–A may be operated. Thus a hazard caused by a dangerous maneuver of an aircraft may be expeditiously removed.

Figure 10:
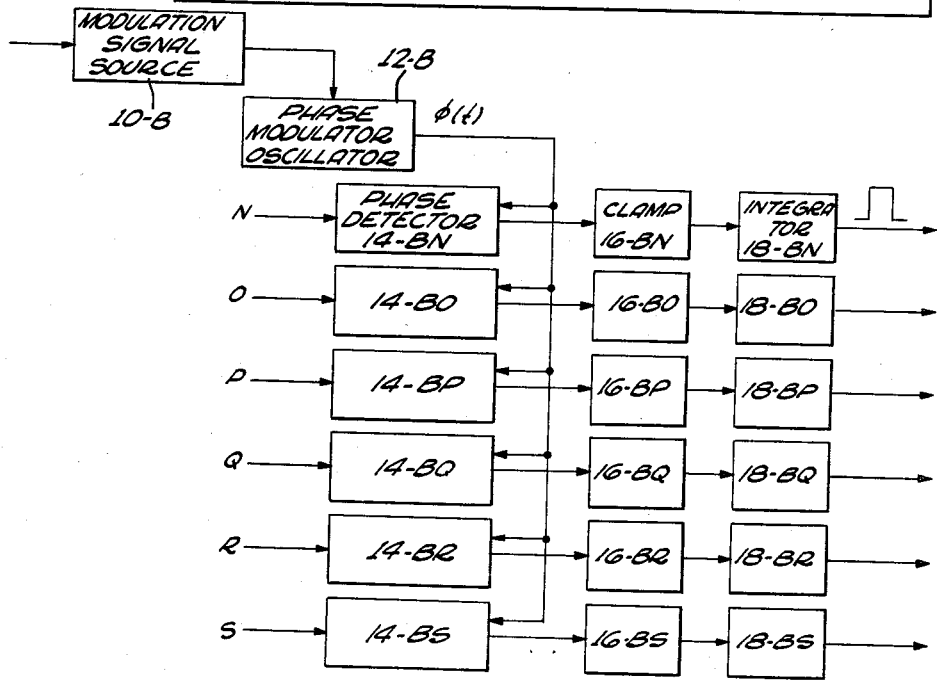
Fig. 10 is a block diagram of an alternative embodiment of another specific feature of the invention.
Figure 3:
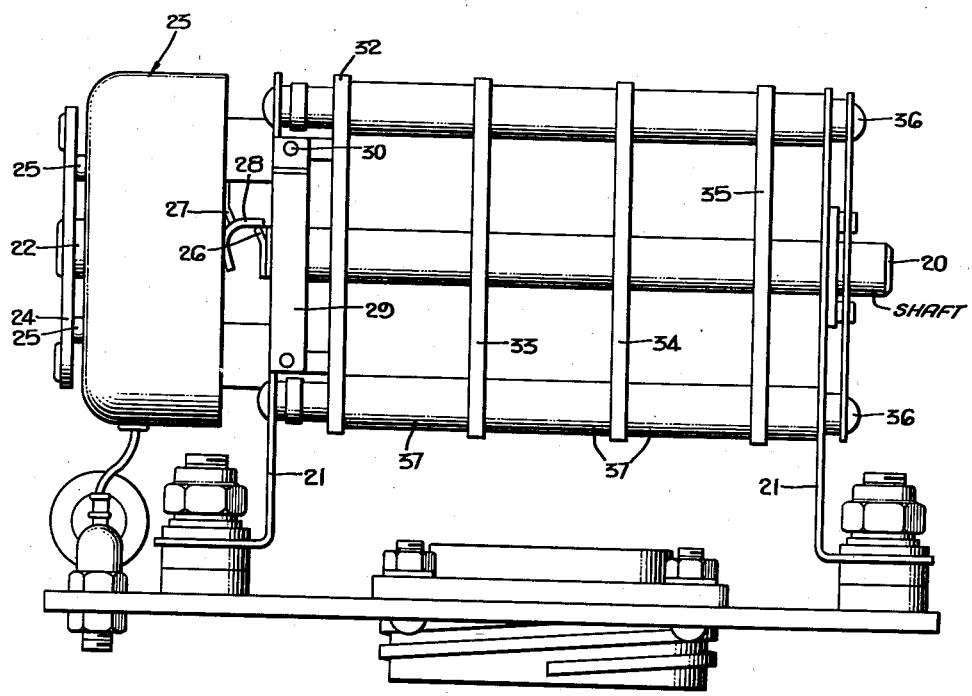
Fig. 3 is a side elevation view of a "Ledex" multiple switch employed in the invention and shown in exploded diagrammatic form in other figures, as will be pointed out.

With the six spots on the indicator 12–A, it will be observed that all tracking channels are "occupied." This is not always necessarily true. All the smaller numbered columns 1, 2 and 3 will contain an incandesced lamp so long as there are one, two or three aircraft respectively being guided in the associated air traffic control system. Means to operate the lamp matrix 14–A are described in the Figs. 2 through 9, inclusive. Fig. 10 is a block diagram of an alternative method of operating the lamp matrix 14–A and will for this reason be explained last.

The first embodiment of the present invention described herein was designed for use as a unit in a ground-controlled approach system for governing the landing of aircraft at an airfield. A signal channel is assigned to each such aircraft and the distance of each craft from the field is indicated by the magnitude of the range voltage in its channel. The range voltages in the respective channels differ successively in steps by any convenient number of volts, which for present purposes may be fixed at twenty volts. For convenience of terminology, a channel carrying a range signal will be designated herein as an active channel and one not occupied by a signal will be called an inactive channel. Operation is basically controlled and timed by a sawtooth voltage that swings between 25 volts positive and 120 volts negative.

The block diagram representation of the present invention in Fig. 2 shows the general relationships of the several constituent functional parts. The reference character applied to a block is usually that of the most significant component of the part represented by the block as used in subsequent detailed explanation.

Range voltage signals, each on an individual channel represented by one of the letters N, O, P, Q, R, S, show by their respective magnitudes the distance from the touchdown point of the aircraft that is being tracked on the channel. If a channel is not tracking it carries 150 volts negative. These channels are shown applied to Schmidt trigger circuits 135 to 140 and the trigger that is connected to a channel that is tracking is made conducting by the rise of a sawtooth voltage from generator 118. When the sawtooth voltage drops the channel having on it the smallest range voltage, i.e. from the nearest craft, cuts off first, followed in the order of the magnitude of the range voltages by all other Schmidt triggers that are tracking. The cut off of each trigger blocks a switch tube 141, 142, etc., which permits the fall-out of a relay energized when the switch tube is conducting. The fallout of each relay sends a recording pulse to a corresponding contact in every one of the order registers. The master order selector is actuated by master order reset switch 123 at each rise of the sawtooth voltage to set up a return circuit from the first order register so when it receives the recording pulse it is actuated to indicate the channel received by the trigger that initiated the recording pulse. After each recording pulse the master order selector is moved one step to establish a return circuit from the second order register, the third order register, etc., each in turn.

It is not necessary that the sawtooth generator run continuously, but only when there is a change in the number of active channels, either by the acquisition of one or more additional active channels or by wave-off, which means the change of a channel from active to inactive for any reason whatsoever. The range channels feed into acquisition detector 73 which feeds an output voltage proportional to the number of active channels into a differentiator 87 that notes any increase in the incoming voltages and sends a signal to the standard gate generator 93, 94. The same channels feed into the wave-off detector which sends a signal to the standard gate generator when there is a decrease in the number of active channels. Whenever the standard gate generator receives a signal, it passes it on to memory 101, 105, whence it goes to a Schmidt trigger 104, then to sawtooth timing multivibrator 109, which activates the sawtooth generator 118.

That the recording pulses sent to the order registers shall not merely be added to each other, but will in each instance reflect the channel and order of a recording pulse, each order register must be returned to zero when it no longer has a recording pulse impressed upon it. This is accomplished by the automatic zeroing circuits 165 to 170 which are connected to receive the proportional voltage output of the acquisition detector so that as many of the zeroing circuits are energized as there are active channels. Each zeroing circuit 165 to 170 is connected to control a specific order register and each zeroing circuit is biased to operate at a definite number of channels, e.g., 165 operates when there is only one active channel, 165 and 166 when there are two, 165, 166 and 167 when there are three, etc. Each zeroing circuit leaves its register free to respond to recording pulses when the zeroing circuit conducts, but holds the register zeroed when it is not conducting. Thus there are as many registers free to respond as there are active channels.

The rotary multiple switch used as the master order selector and as order registers in the present invention is manufactured by the C. H. Leland Company of Dayton, Ohio, and is sold under the trade name of "Ledex." It comprises a rotatable shaft 20 mounted in end brackets 21. Upon a stub shaft 22, rotatably mounted in the housing of solenoid 23, is an end plate 24 having a driving connection with the stub shaft 22. The solenoid 23 exerts upon the end plate a powerful tractive effort when energized. Between the end plate 22 and the housing of solenoid 23 are three equally spaced ball bearings 25, mounted in a substantially hemispherical cup in the housing of the solenoid and riding in arcuate grooves in end plate 24, the depth of the grooves increasing in the counter clockwise sense. Thus, when the solenoid is energized and the end plate is drawn toward it, the reaction of the balls 25 with the "inclined plane" bottoms of the grooves applies a torque to end plate 24 that rotates the end plate, and consequently shaft 22, in a clockwise direction as seen from the left hand end of the device in Fig. 3.

Fixed to the contiguous ends of each of shafts 20 and 22 is a respective metal disc having portions 26 and 27 struck out to extend axially to engage each other and form a ratchet to drive shaft 20 when shaft 22 is rotated. A cam 28 is carried by the above-mentioned metal disc on shaft 22 to move axially with and to rotate with that shaft as end plate 24 is drawn in and rotated by solenoid 23 and near the end of its movement cam 28 moves under spring leaf 29 that carries a contact point 30 and opens the contact, thus breaking the supply circuit to solenoid 23, as will be more fully explained hereafter. A return spring (not shown) then pulls end plate 24 and shaft 22 back to their initial positions.

Figure 4:
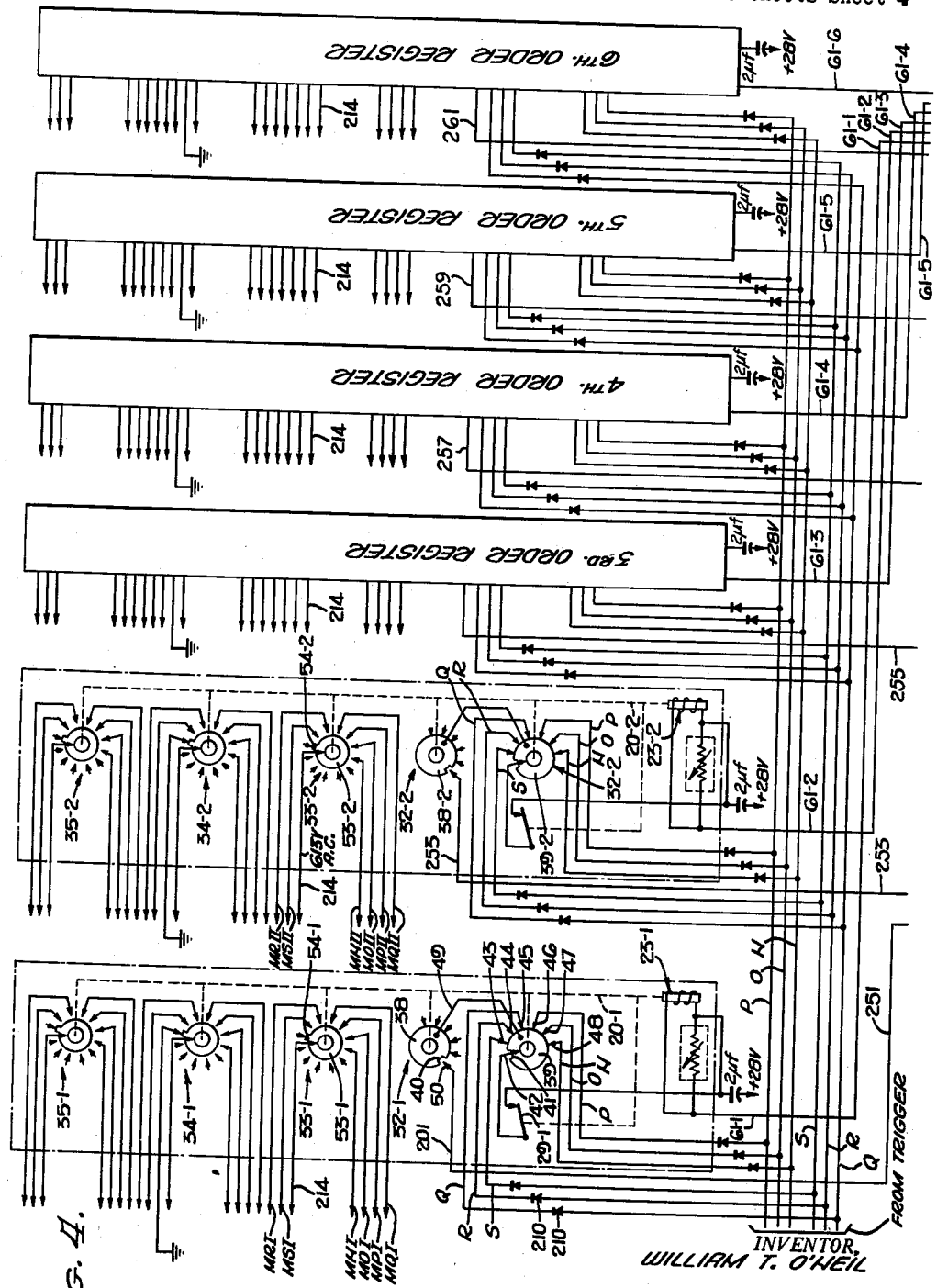
Fig. 4 is a partial diagrammatic and partial block diagram of order registers, whereat two are shown in exploded diagrammatic form and the others in block diagram since all are of identical construction.

The rotary switch also includes a plurality of wafers 32, 33, 34 and 35 of insulating material mounted concentrically with shaft 20 on longitudinal rods 36 with spacers 37 between each two wafers. Reference is now made to Fig. 4 wherein is shown a "Ledex" in exploded diagrammatic form, the parts being given the same reference characters as in Fig. 3 but followed by (–1), (–2), (–3), etc., in each case where shown in the diagram to indicate the order register under construction. Conductive rings 38 and 39 are insulatingly mounted on shaft 20 centrally of and coplanar with the right-hand face and the left-hand face, respectively, of wafer 32–1. It will be noted that each has a peripheral cut-out portion, identified respectively by 40 and 41. Wiping contact 42 fixed to wafer 32 extends radially inwardly beyond cutout 41 and makes continuous contact with ring 39 and is connected to contact blade 29–1 so that so long as current is supplied to ring 39 the solenoid 23–1 will be energized each time the contact points close after the return movement of end plate 24 and shaft 22 and will continue to step shaft 20. Contacts 43 to 48, both inclusive, wipe ring 39 adjacent its periphery so that they are out of contact with the ring when cutout 41 portion is in registry with the angular position of any of the contacts of the group. It is apparent that if one of the contacts 43 to 48 is connected to a voltage supply solenoid 23–1 will continue to step shaft 20 until the cutout 41 is moved to the position of the live contact, at which time the circuit will be broken and the "Ledex" will be homed on that contact. There must of course be a return path to complete the circuit through solenoid 23–1 in order for it to function. How and when such return path is established and how and when the contacts 43 to 48 are energized will be fully explained hereinafter.

The two rings 38 and 39 are conductively connected together as indicated by element 49. The only effective contact that wipes ring 38 is designated 50 and is connected to the automatic zeroing component, to be later described, and thus maintains a voltage supply to solenoid 23–1 until cutout 40 reaches the position of 50, at which time the rotation of shaft 20 is stopped. Examination of the drawing makes it apparent that when rotation of shaft 20 is stopped by contact 50 being in cutout 40, the cutout 41 is in position to begin moving across contacts 43 to 48 at the next step of rotation of shaft 20. Hereinafter the device will be said to be zeroed or in zero position when the conditions just described prevail. The zeroing pulse to contact 50 is never simultaneous with the energizing of any of contacts 43 to 48. The "Ledex" shown in Fig. 4 and in part described above is termed an order register, having the function of responding to the range voltage from a designated channel to show channel and priority order of that channel, as will be fully explained. There will be as many order registers as there are channels to be tracked, conveniently six, although all are not shown in detail in the present drawings because they are identical in structure and function with those shown and described. The name "order register" is used since the signal derived from the channel having the first order of priority of landing is transmitted to the first order register, and so on.

The order registers are conditioned for response in the proper sequence by the master order selector. It will be recalled that solenoid 23 of a "Ledex" can operate only if a voltage return connection is provided. The function of the master order selector is to establish such return connections to the order registers in the sequence of their ordinal designation first, second, third, etc. The manner of establishing the return connections will now be set forth.

Figure 8:
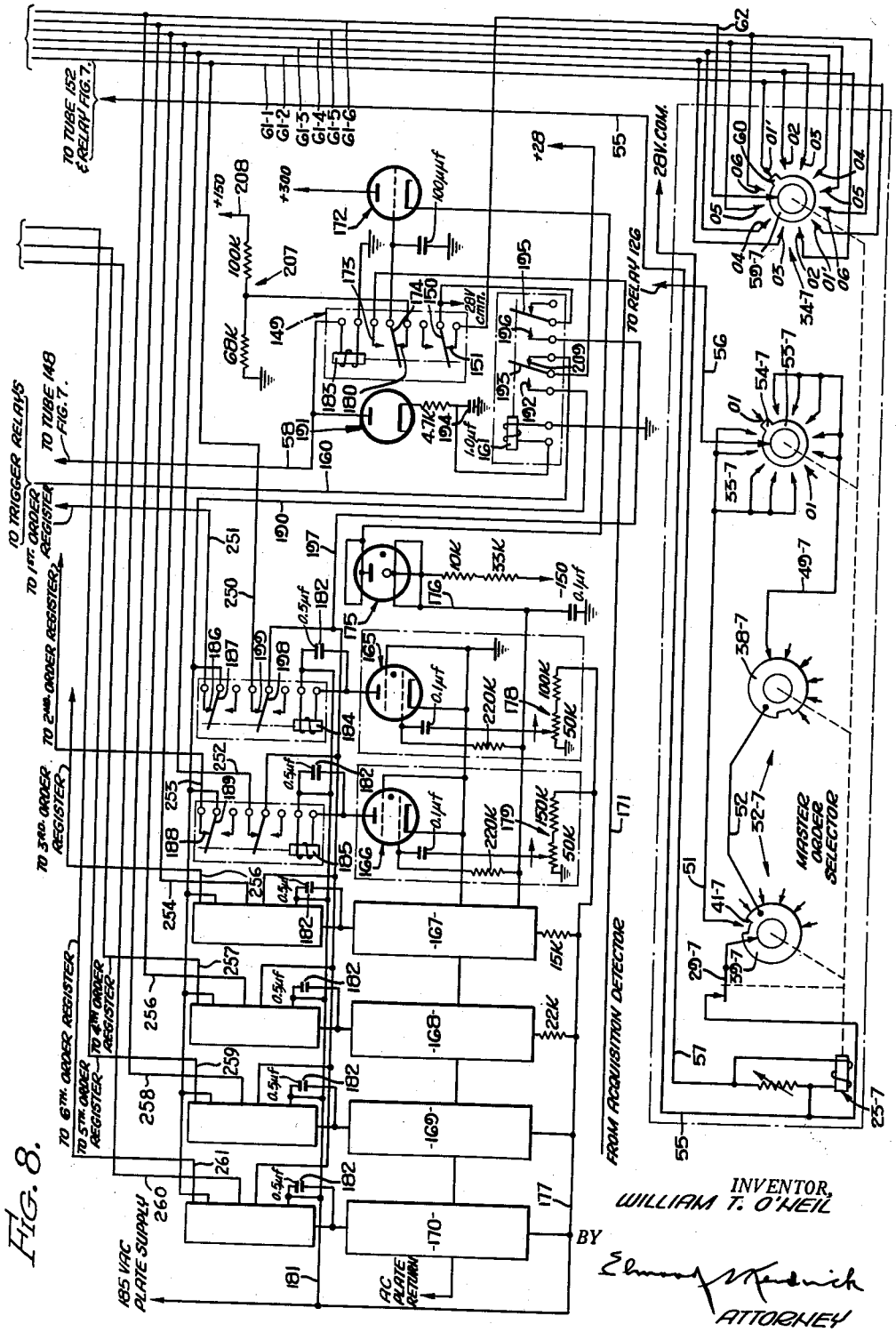
Fig. 8 is a schematic view of automatic zeroing equipment and a master order selector.

The master order selector is likewise a "Ledex" but with the connections made to perform its particular functions. As shown in Fig. 8, the solenoid 23–7 may be energized by current through rings 38–7 and 39–7, the latter being fed directly through lead 51 so long as its contact is not in cutout 41–7 and through connection of 49–7 from 38–7 when it is. Conductive ring 53–7 is insulatingly mounted on the same shaft as rings 38–7 and 39–7, but instead of a cutout portion it has a projecting tab 54–7 that wipes the annular series of contacts disposed around it. Two diametrically opposite contacts designated O1 have no conductor connected to them, but the five contacts shown on one side of the diameter between contacts O1 are connected to lead 51 while those on the other side of that line are connected to ring 38–7 by lead 49–7. The rising positive edge of the sawtooth voltage closes a contact to supply 28 volt current to ring 53–7 through lead 56 so that so long as tab 54 touches any other than one of the O1 contacts while the 28 volts is thus applied current will flow to solenoid 23–7 through rings 38–7 and 39–7 and contact spring blade 29–7 to 28 volt common lead 57 and the "Ledex" will be stepped until tab 54 reaches one of the contacts O1 when the rotation will be stopped. Impedance delay means hold the 28 volts applied for a sufficient interval to accomplish this, as will be set forth. The current thus supplied is termed the master order index pulse. The designation O1 is used since when ring 53–7 is in that position the master order selector is set to condition "order one" order register (first order register) to function, as will be explained. It is apparent the master order selector "Ledex" will always stop in position to condition the first order register after each rise of the sawtooth voltage, and it is then said to be "homed" on the first order register. Solenoid 23–7 is energized directly through lead 55 after each recording pulse signal from an active channel. It will be seen that this current does not pass through ring 39–7 and the breaker contact 29–7 but only through the solenoid to common lead return 57 and so can rotate the shaft but one step regardless of how long it is applied.

Insulatingly mounted on the same shaft as rings 38–7, 39–7 and 53–7 is another conductive ring 59–7 similar to 53–7 with a peripheral tab 60. Disposed around ring 59–7 is an annular series of contacts designated O1', O2, O3, O4, O5, and O6, the diametrically opposite ones being given the same numeral because they are connected to respective common leads 61–1, 61–2, 61–3, 61–4, 61–5, and 61–6 that are respectively in the return circuits from the solenoids of order registers 1 to 6. A lead 62 is continuously connected to ring 59–7 and, through a relay 149 that operates at the proper moment (to be explained), completes the return circuit from the order register connected to the contact that is at that instant touching tab 60. It is apparent that no matter which half-rotation the ring 59–7 has just executed the return path from the first order register will be established through lead 61–1, one of the contacts O1', tab 60, ring 59–7 and lead 62 ready to permit the first order register to function when a signal is received by it and the above-mentioned relay closes. Likewise in turn, the second, third, etc., order registers will be conditioned for response in their turns as ring 59–7 is rotated one step at a time to cause tab 60 to wipe contacts O2, O3, etc., seriatim.

Figure 5:
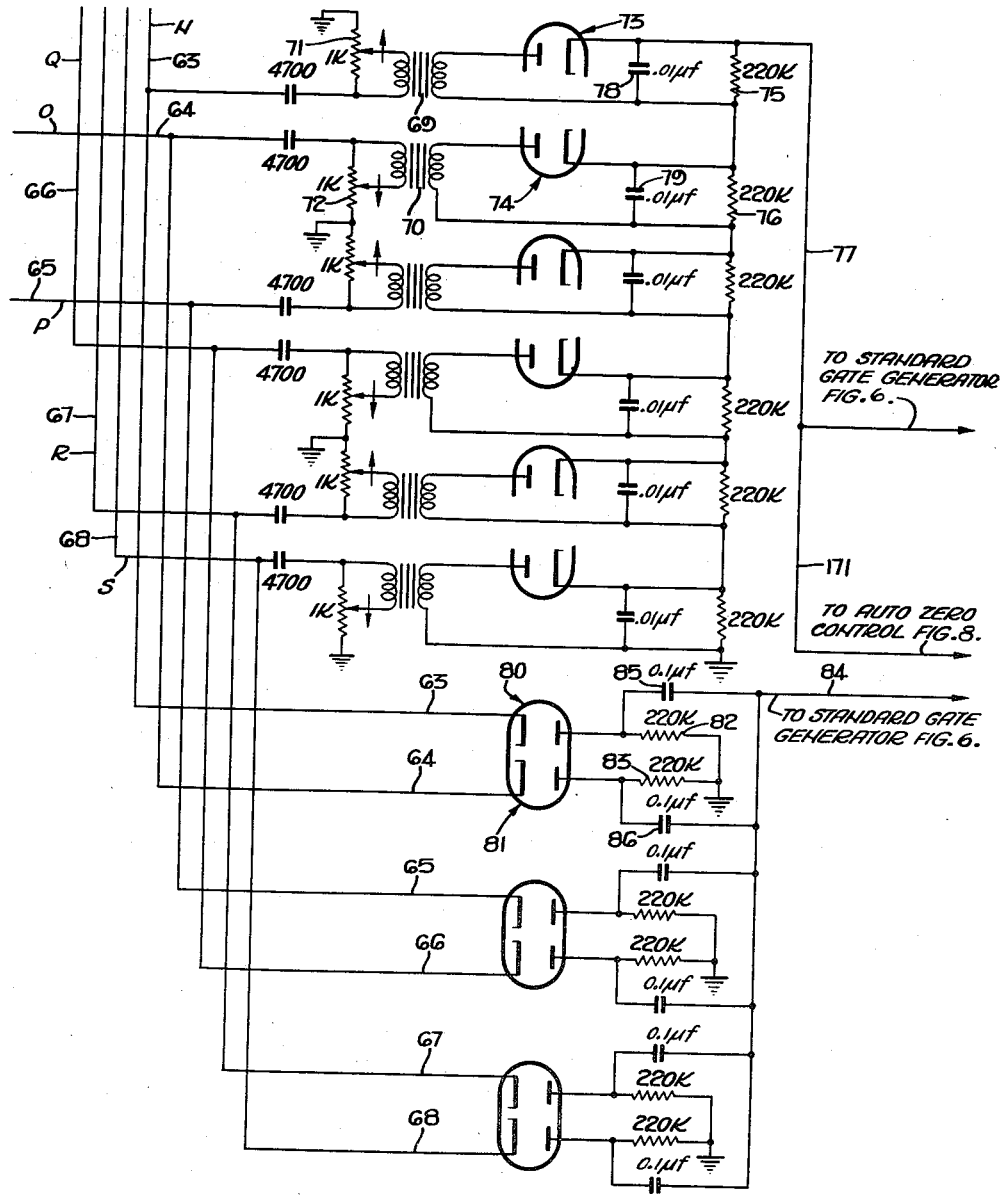
Fig. 5 is a diagrammatical view of an acquisition detector and a wave-off detector.
Figure 6:
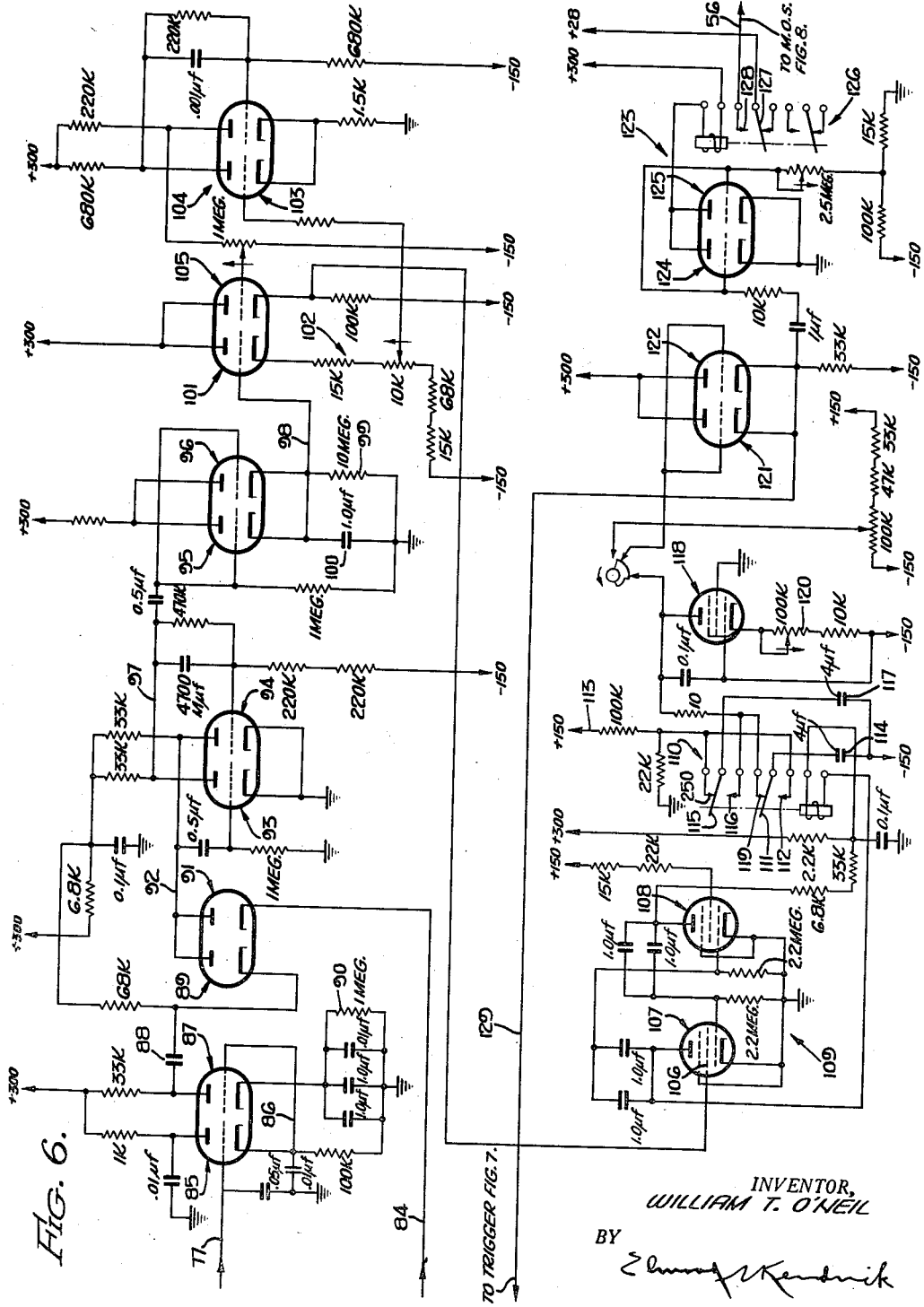
Fig. 6 is a diagrammatic representation of a sawtooth generator in associated controlling circuitry.
Figure 7:
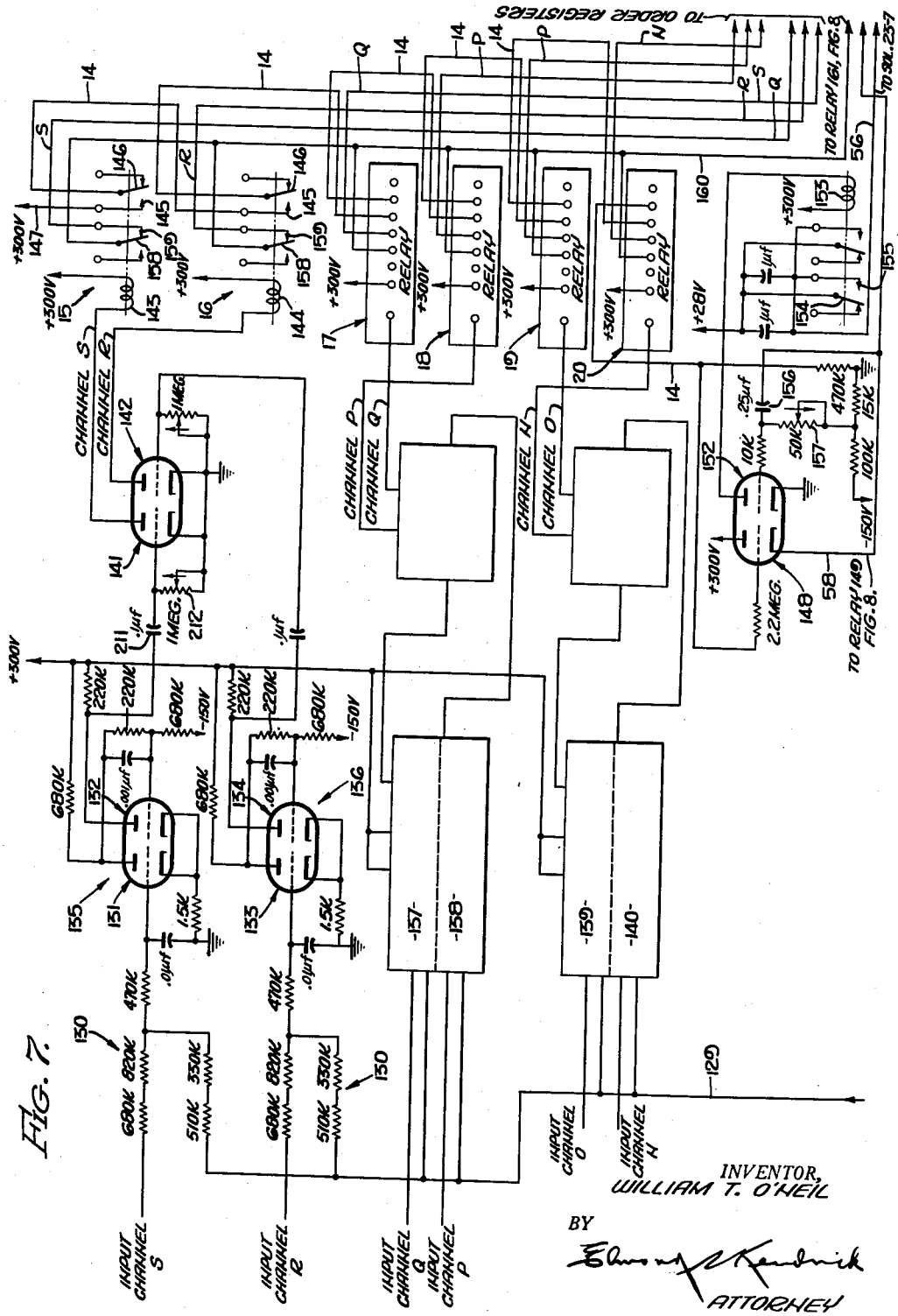
Fig. 7 is a partial schematic view and block diagram of Schmidt triggers and associated relays, two being shown diagrammatically and the remainder, which are identical in construction, being in block diagram.

The generation of the before-mentioned sawtooth voltage is described as being initiated by a signal derived from changes in the range voltage channels, but it is to be understood that it can as well be done periodically by any of the well-known electronic or mechanical timing devices, or even manually. For purposes of description it is herein assumed that there are six range channels available for feeding in signals, which channels may be considered as respectively coming in on leads 63, 64, 65, 66, 67, and 68 (Fig. 5). Each of these leads feeds into one terminal of the primary of a transformer 69, 70, etc., with the other terminal of the primary grounded through an adjustable resistor 71, 72, etc. The secondary circuit of each transformer includes a respective diode 73, 74, etc., and a load resistor 75, 76, etc. The adjustable resistors in the primary circuits are set so that the voltage that appears across load resistors 75, etc., is, for example, 10 volts. Inasmuch as all the load resistors are connected in series and to a common output lead 77 the voltage in lead 77 will be 10n, where n is the number of active channels. By virtue of the rectifying action of diodes 73, 74, etc., and the capacitors 78, 79, etc., connected across the output resistors 75, etc., the 10n voltage will be D.C. The transformers 69, 70, etc., provide isolation so the secondaries may reach a high D.C. voltage when required. The diodes, transformers, and load resistors just described are collectively designated the acquisition detector since each time a theretofore inactive channel becomes active another diode is caused to conduct and a 10 volt increase appears on lead 77.

The range voltage leads 63 to 68 are also each respectively connected to the cathode of a diode 80, 81, etc., whereof the anodes are connected to ground through respective resistors 82, 83, etc., and to a common output lead 84 through a respective capacitor 85, 86, etc. When "wave-off" occurs, i.e., a theretofore active channel becomes inactive, for any reason, the range voltage signal is replaced by 150 volts negative and the cathode of the diode 80, etc., that is connected to that channel will become strongly negative, the diode will conduct, and a negative pulse will be sent through capacitor 85, etc., as the case may be to the common lead 84. This group of diodes with cathodes connected to the range voltage channels is collectively termed the wave-off detector, for reasons that are apparent.

Lead 77 from the acquisition detector is directly connected to the grid of a triode 85 (Fig. 6) which is connected as a cathode follower by lead 86 to the grid of triode 87 and so the signal on the grid of triode 85 is isolated from the following circuitry. Each 10 volt increment of voltage on lead 77 due to the acquisition of another active channel causes an increase in the current through 87 which thus sends out a negative signal through capacitor 88 to the cathode of diode 89. Triode 87 functions as a differentiator since plate current can flow only when the grid-to-cathode follower differential is greater than cutoff. Resistor 90 is so large that the plate current it permits to flow may be neglected.

Output lead 84 from the wave-off detector is connected to the cathode of a diode 91 whereof the anode is connected in common with the anode of diode 89 to a lead 92 so that an increase in the number of active channels produces in lead 92 a signal derived from the acquisition detector and when there is a decrease in the number of active channels a signal is put on lead 92 from the wave-off detector. The signal on lead 92 triggers a multivibrator comprising triodes 93 and 94, termed the standard gate generator, that produces a pulse of substantially constant duration and amplitude that is applied to the grids of triodes 95 and 96 via lead 97. The cathodes of triodes 95 and 96 are connected to a common output lead 98 to function as a cathode follower. The values of capacitance 100 and resistor 99 are such as to give a large time constant for the discharge of the cathodes of triodes 95 and 96 so that the absolute value of the time constant is not critical and variations due to such causes as humidity are relatively unimportant. The signal impressed over lead 97 exceeds the maximum positive grid signal for triodes 95 and 96 for high impedance grid conditions so the cathode follower is forced to operate at zero bias during that time, which results in rapid charging of capacitor 100. After the signal is terminated the cathode potential of 95 and 96 remains high and can discharge only through resistor 99. Triode 101 is a D.C. level shifting device and high impedance load for the cathodes of triodes 95 and 96 and has in its cathode circuit a voltage divider 102 that is connected to the grid of triode 103 in Schmidt trigger 104.

The threshold voltage above which triodes 95 and 96 fire is such that a single cycle of operation of these tubes is sufficient, because of the long time constant of the R.C. combination 99 and 100, to hold Schmidt trigger 104 fired until capacitor 100 has fallen to a small fraction of its charged value. The R.C. value concerned is 10 seconds and a usable time of 2.5 R.C. is readily achievable where a definite regenerative pick-off such as the Schmidt trigger 104 is employed. The output of trigger 104 is applied to the grid of triode 105 which is connected to function as a cathode follower to apply its output to the screen grid 106 of pentode 107 which, with pentode 108 and the interconnecting circuitry, constitutes a sawtooth timing multivibrator 109 having a natural period of ten seconds. The on-off control applied to the screen of triode 106 merely starts and stops it, thus permitting several free running cycles per firing of the standard gate generator 93, 94 when a signal is received from either the acquisition detector or the wave-off detector.

As multivibrator 109 free runs relay 110 is alternately energized and deenergized. When this relay is energized the contacts 111 and 112 close a circuit from 150 volt source 113 through capacitor 114 to charge the latter, while contacts 115 and 116 close a circuit from capacitor 17 through sawtooth generator pentode 118 to discharge the capacitor 117 through tube 118. When the relay is deenergized contacts 111 and 119 close to discharge capacitor 114 through pentode 118 while contacts 115 and 250 close a charging circuit through capacitor 117. The alternate discharge of capacitors 114 and 117 through sawtooth generator 118 produces the sawtooth voltage, which runs from 25 volts positive to 120 volts negative, for timing and controlling the operation of the system. Adjustable resistor 120 provides for controlling the slope of the sawtooth voltage. Pentode 118 is operated degeneratively to give constant current discharge from the capacitors 114 and 117. Triodes 121 and 122 are connected in the output circuit of pentode 118 to operate as a cathode follower and provide a low impedance output from the pentode, and from hence all the applications of the sawtooth voltage are made.

One output from triodes 121 and 122 goes to the master order selector switch 123 wherein the triodes 124 and 125 are normally cut off, but the rising positive edge of the sawtooth voltage places them in conduction, thus energizing relay 126 to close contacts 127 and 128 and put 28 volts on lead 56 and hence on ring 53-7 of the master order selector "Ledex." As before described, this will energize solenoid 23-7 and keep the master order selector in rotation until ring 57 homes on one of the contacts O1, in which position a return is established through lead 62, ring 59-7 and one of the contacts O1' to the solenoid 23-1 of the first order register and that register is then conditioned to respond to the first range voltage channel that sends out a signal, in a manner to be described.

Another output of sawtooth voltage is put on lead 129 which is connected in common to the midpoint of a respective precision divider 130 (Fig. 7) which has a terminal in the free grid of one of the triodes 131, 133, etc., of Schmidt triggers 135, 136, 137, 138, 139 and 140. Schmidt triggers 135, etc., are designed to fire near ground potential on their free grids. The other terminal of each precision divider 130 receives the signal from a respective channel at all times. When a channel is inactive, it puts out a slightly negative range voltage. The range voltages vary from 0 at the point of touchdown to 200 volts at a distance of ten miles. The grid voltage applied to each Schmidt trigger is the resultant of the combined range signal and the sawtooth voltage, the time between rising edge and rising edge of the latter being on the order of twelve seconds, determined by the circuitry that influences the operation of sawtooth generator 118, as above described. The maximum positive voltage of the sawtooth is sufficient to place any of the triodes 131, 133, etc., of the Schmidt triggers in conduction if the range voltage for the particular channel is between 0 and 200 volts, i.e., if the particular channel is tracking. However, if a particular channel is not tracking, the 20 volts positive maximum will not fire the triode 131, 133, etc., as the case may be. The maximum negative amplitude of the sawtooth, 120 volts, is sufficient to drive any Schmidt trigger below the conduction point and cause it to "drop out" under all tracking circumstances up to 200 volts. The range channels will for convenience be designated by the letters N, O, P, Q, R, S.

Assume that range channel S is connected to the grid of triode 131 and channel R is connected to the grid of triode 133 and that the aircraft being tracked by channel R is nearer than the craft on channel S, that is, channel R has landing priority over channel S and the range voltage on channel R is less. As the sawtooth voltage rises both of triodes 131 and 133 will be thrown into conduction, which will hold triodes 132 and 134 in Schmidt triggers 135 and 136 cut off. Thus triodes 141 and 142 whereof the grids are connected to the anode supply of triodes 132 and 134 will be conducting and the respective relay solenoids 143 and 144 connected in the anode supply of the last-mentioned triodes will be energized. It should be noted that the corresponding triode connected to each of the Schmidt triggers 135 to 140 is normally conducting so that the respectively connected solenoids are energized and the contacts 145 and 146 in each are closed to place 300 volts from source 147 via lead 14 on the grid of triode 148 which has connected in its cathode circuit by lead 58 a relay 149, Figs. 2 and 8, that, when energized, opens contacts 150 and 151 and so prevents the establishment of a return path from any order register via lead 62. When any one of relays 143, 144, etc., is deenergized the 300 volt potential to the grid of triode 148 is cut off and the return paths may then be established.

The 300 volts are also applied to the grid of triode 152 which draws its anode supply through solenoid 153 which closes contacts 154 and 155 and puts 28 volts on lead 56 which thus supplies current to ring 53–7, thence to ring 39–7 and solenoid 23–7 of the master order selector to advance the selector one step. The RC combination of capacitor 156 and the resistor 157 in the grid circuit of triode 152 holds it conducting for a sufficient time to insure that the step will be made.

When the sawtooth voltage decreases triode 133 that carries the signal of channel R will cut off first since the the range voltage of channel R is less. When tube 133 cuts off its anode voltage rises and this rise is transmitted to the grid of tube 134 and causes that tube to conduct. The drop in the anode voltage of 134 when it begins to conduct is applied to the grid of 142 which cuts off the latter, deenergizing relay 144, cutting off the 300 volts to triodes 148 and 152, and permitting contacts 158 and 159 to close to put 28 volts from lead 160 on the contact 44 of each order register when solenoid 161 is not energized. This 28 volt signal is termed the recording pulse. As above explained, the master order selector is homed by each rise of the sawtooth voltage to establish a return from the first order register, so that the first order register will now be stepped until the cut out portion 41 of ring 39 comes to the position of contact 44, when the rotation will stop. Since all the leads N, O, P, Q, R, and S from the Schmidt triggers and associated relays are connected to conductive rings 39, 39–2, etc., in all registers the unidirectional conductive devices 210 are used in the leads to prevent feedback.

Likewise, if channel S is second in priority of landing triode 131 will be next cut off, which will result in the cutting off of triode 141, the deenergizing of solenoid 143 and the placing of a signal on the contact 43 of each order register. When triode 142 resumed conduction after the recording pulse to the contacts 44 of the order registers, the 300 volts to triode 152 caused the energizing of solenoid 153 which placed a 28 volt stepping pulse on solenoid 23–7 of the master order selector via lead 56 and rotated the selector one step so that a return path was then established from the second order register. Therefore, the second order register will now rotate until the cut-out 41 is at the position of the contact 43 thereof and the rotation will then stop.

The same sequence is followed through all the active channels. As the Schmidt trigger corresponding to each of the various channels is cut off a recording pulse will be sent to all the order register contacts respectively connected to each Schmidt trigger and the master order selector provides in turn for a return connection to each of the order registers. It is to be understood that this is repeated each cycle of the sawtooth voltage.

It will be recalled that the sawtooth generator does not run continuously but only when set in operation by a signal derived from either the acquisition detector or the wave-off detector. The reason for this is that so long as there is no change in the relative status of the active and the inactive channels no useful purpose is served by continuous running of the sawtooth generator but there would be the distinct disadvantage of unnecessary wear on the equipment and fatigue of personnel by the clattering of the relays. However, when an active channel drops out or an inactive channel picks up a range signal the sawtooth generator is started and the whole situation is analyzed and priorities assigned to the several then active channels.

Due to the complete reappraisal of the traffic situation presented by the range voltage channels at each rise of the sawtooth voltage and the fact that there frequently are changes in the traffic situation, it is necessary that each order register be returned to zero each cycle so that it will be able to respond accurately to any signal sent to it. The automatic zeroing component now to be described is provided for that purpose. This includes thyratrons 165 to 170, equal in number to the number of range channels (Figs. 2 and 8). That the response of the zeroing means may be proportioned to the number of active channels the $10n$ volt signal from the acquisition detector is applied to lead 171 by which it is put on the grid of tube 172 (Fig. 8) when contacts 173 and 174 are closed by conduction of tube 148 when the 300 volts are on its grid at the time all the relay solenoids 143, 144, etc., are energized, i.e., when no recording pulse is acting on any of the order registers. The output of tube 172 is proportional to $10n$ and is applied as a cathode follower to constant voltage device 175 which holds its output uniformly at 87 volts below the voltage of the cathode of tube 172 and this is applied through conductor 176 to the grids of thyratrons 165 to 170. An alternating voltage is also applied to the grids of the thyratrons from lead 177 through the respective voltage dividers 178, 179, etc., with thyratron 165 biased so it will fire when only one channel is tracking. The A.C. voltages on the grids of the several thyratrons differ by increments of ten volts so that when two channels are tracking both 165 and 166 will fire, if three channels are tracking then 165, 166 and 167 will all fire, and so on for the total possible number of channels. An alternating potential of 185 volts is put on the plate of each of the thyratrons 165 to 170 from lead 181 through relays 184, 185, etc., and the respective capacitor 182.

After each recording pulse all the relays controlled by the Schmidt triggers 135, 136, etc., are actuated to place 300 volts on tube 148 which energizes solenoid 183 that closes contacts 173 and 174 to put the voltage derived from the acquisition detector on the grid of the tube 172, thence to device 175 and to the grids of the thyratrons 165, 166, etc., and causes those thyratrons corresponding to the active channels to fire. When contacts 186, 187 are closed the 28 volts on lead 190 is transmitted by lead 251 to contact 50 in the first order register which steps the first order register until cut-out 40 is opposite contact 50, when the circuit is broken and the rotation stops as previously mentioned. The zeroing lead from contacts 188, 189 to the second order register is 253. In like manner each thyratron controls a zeroing circuit. Each thyratron that fires energizes the respective solenoid 184, 185, etc., in its plate circuit and opens the circuits at contacts 186, 187 and 188, 189, etc., respectively controlled by each solenoid 184, etc. This withholds the 28 volts on lead 190 from those order registers that are homed on a channel but since the solenoids associated with any thyratrons that did not fire are not energized the 28 volts in lead 190 is applied to the order registers corresponding to the non-fired thyratrons to zero the registers.

When tube 148 conducts the diode 191 also passes current, energizing relay 161 to close contacts 192 and 193 and connect lead 190 to the 28 volt source. While diode 191 conducts the capacitor 194 is charged and after conduction by the diode ceases capacitor 194 must discharge through solenoid 161 as it cannot discharge back through the diode. This delay in cutting off the 28 volts from lead 190 insures that all registers corresponding to inactive channels will be zeroed. Energized solenoid 161 also closes contacts 195 and 196 which provides a return for the order registers being zeroed through lead 197 and contacts 198, 199 which are closed in each relay associated with a thyratron not firing from thyratron 165 this return circuit includes lead 200 and lead 61-1, from thyratron 166, leads 202 and 61-2, etc. It is to be understood that the corresponding connection from thyratron 166 to the second order register is along leads 202 and 61-2 from thyratron 167 to the third order register along leads 204 and 61-3, etc.

When any one of the Schmidt triggers 135 to 140 is cut off the respective solenoid 144, 145, etc., controlled by the Schmidt trigger that cuts off is deenergized, a recording pulse is sent to the respective order register and the contacts 145, 146 open so that the 300 volts is cut off from tube 148 and thus solenoid 183 is deenergized and contact 174 closes circuit through contact 180 to place on the grid of tube 172 a bias from divider 207 and 150 volt source 208. This bias is great enough so that the voltage applied to the grids of thyratrons 165 to 170 causes them all to fire, energizing the solenoids 184, 185, etc., and thus breaking the zeroing circuits to the order registers through contacts 186, 187 and 198, 199, etc., and so all the order registers are free to respond to a recording pulse if it comes. It will be recalled that a recording pulse is sent out each time any Schmidt trigger cuts off.

When the 300 volts removed diode 191 ceases to conduct and after the delay due to capacitor 194 the solenoid 161 is deenergized which permits contact 193 to close with contact 209 and connect lead 160 to plus 28 volts which is thus supplied to the recording pulse relays 15 to 20 for transmission to the respective order register as the corresponding Schmidt trigger may cut off. Although there is a delay in supplying the 28 volts to the recording pulse relays after a Schmidt trigger cuts off, due to capacitor 194, the RC combination of capacitor 211 and high value resistor 212 (Fig. 7) keep tube 141 cut off for sufficient time for the connection to be made and the recording pulse transmitted as called for. It is to be understood that each tube analogous to tube 141 in circuit with a Schmidt trigger has a like RC combination.

The data derived from an analysis of the traffic situation according to the present invention are primarily intended for use in ground controlled approach systems but the manner of their application for that purpose is beyond the scope of this disclosure. However, it is desirable that personnel operating the present invention be able to check on the functioning of the apparatus and for this reason means are provided to give a visual signal that shows uniquely for each recording pulse the channel from which the pulse was derived and the landing priority order of the craft being tracked by that channel.

Figure 9:
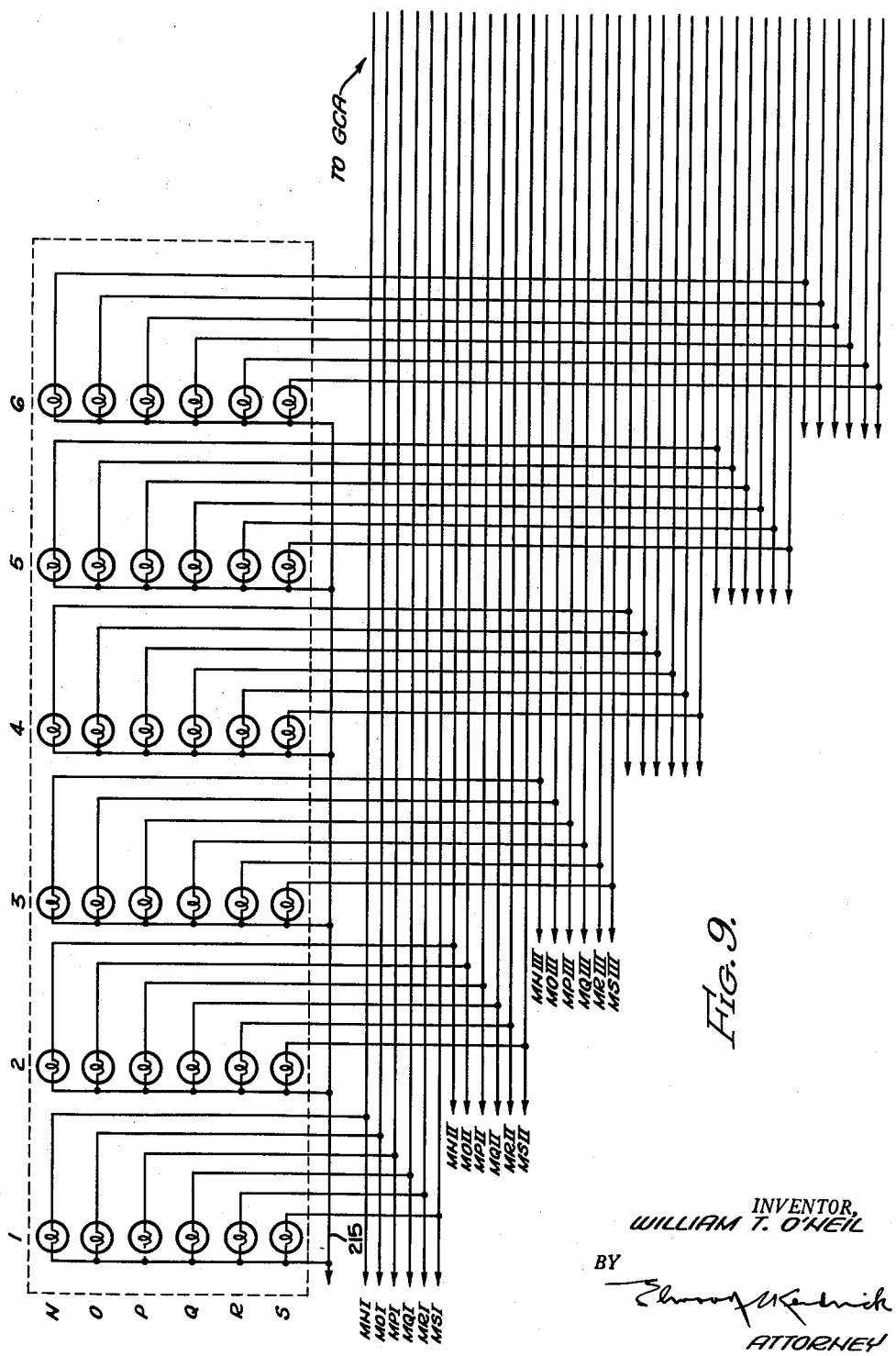
Fig. 9 is a schematic view of a lamp matrix and circuits connected therewith.

The signals are displayed on the lamp matrix 14-A as shown in Fig. 9 with associated electrical wiring. Each order register has a conducting ring designated by 53 followed by a numeral showing the order of the register, e.g., 53-1 means conducting transmit ring of the first order register. The transmit rings are fixed on the shaft of the register to rotate with the rings 38 and 39. Lead 214 continuously supplies 6.3 volts A.C. to the transmit rings. Around the transmit ring 53-1 are contacts connected to leads MNI (MN followed by Roman numeral one), MOI, MPI, MQI, MRI, and MSI, disposed to be contactible by tab 54-1 on ring 53-1. The designation MNI, etc., is used to show that the lead so identified connects the lamp matrix to the N channel at the first order register, MOII connects the O channel via the second order register to the matrix, etc. These contacts are so arranged angularly that when ring 39 is homed on contact 48 (channel N) the tab 54-1 will close the circuit through contact for lead MNI which will light the lamp in the top horizontal row and in the left hand vertical row, showing that channel N has first priority of landing. The lead 215 is the common return from all the lamps. In like manner, if the fifth order register is homed on channel Q, the lamp in the fourth row down from the top and in the vertical row fifth from the left will be lighted to show that channel Q has the fifth priority order to land. There will be such a visual signal for each channel that is tracking to show what the landing priority order for each respective channel is.

The same leads that carry signals to the matrix are connected to other utilities employed to convey the necessary landing priority information to pilots, such as ground controlled approach (GCA), but that equipment is beyond the purview of this disclosure.

An alternative arrangement for the Schmidt triggers 135 through 140 and the switch tube and relay combinations 15, 141, 16, 142, etc., is shown in Fig. 10. This arrangement is employed to produce output pulses or identification signals when the phase of a phase modulated oscillator 12-B exceeds respectively those of alternating input signals N, O, P, Q, R and S.

A modulation signal source 10-B there shown may be employed to produce a sawtooth voltage to vary the phase of the modulated oscillator 12-B linearly in response to an input pulse indicating a change in traffic conditions. Phase detectors 14-BN, 14-BO, 14-BP, 14-BQ, etc., are employed to compare the output signal of the phase modulated oscillator 12-B with the A.C. input signals N, O, P, Q, R and S.

Clamps 16-B and 16-BO, etc., are connected to the output of the phase detector 14-B to clamp the output thereof to, for example, ground when the output signal of the phase modulator oscillator 12-B is, for example, less than that of the input signals. When the phase of the modulated oscillator output signal exceeds that of an input signal, an integrator 18-B corresponding respectively to the particular phase detector 14-B is employed to produce an output pulse or identification signal. Similar arrangements of course may be made with frequency or amplitude modulated alternating signals or pulse width, pulse amplitude or pulse time modulated pulse signals.

What is claimed is:

1. In an aircraft landing signal system, a unit for determining the order of landing of several aircraft to each of which is assigned a range signal channel, comprising a respective electronic trigger having two tubes with the grid of the first tube of each trigger connected to receive a respective signal channel, means to generate and supply to the grid of each first tube a sawtooth voltage of predetermined duration per cycle having a sufficient positive amplitude to render conducting each first tube which has a range signal impressed upon it and of sufficient negative amplitude to cut off all the first tubes even though range signals are impressed, said tubes being thereby successively cut off in the order of increasing signal strength in the respective channels; a respective order register assigned to each priority of landing, each register having a respective input contact corresponding to each channel and connected to receive a signal derived from cutting off the said first tube of the trigger in that channel, a rotatable shaft and fixed thereon a substantially annular conductive member disposed to touch said contacts but having a cut out portion that is in turn brought into registry with each contact as the shaft is rotated, a respective output contact for each channel, means fixed on the shaft to be rotated into position to energize the output contact corresponding to a homed input contact; electrical means to rotate the shaft whereof the supply circuit includes at least one of the input contacts, the annular member and a return path; means to control the rotation of the shaft by steps having an angular magnitude equal to the central angle between adjacent contacts whereby when rotation of the shaft brings the cut out portion to an energized contact the supply is interrupted and the register is homed on the channel represented by the contact at the cut out portion; means controlled by the rising voltage of each sawtooth cycle to establish a return path from the shaft rotating means of the first order register; means responsive to signals derived from cutting off the first tubes to establish return paths from the means to rotate the other register shafts in a succession defined by the ordinals of the respective registers; and means connected to all the registers to convert into usable signals the outputs from the registers to show the channel and priority order defined by the homed position of each register.

2. A unit as set forth in claim 1 that also comprises means connected to receive incoming range voltages and conditioned to be responsive to a decrease in the number of channels receiving range voltages, other means likewise connected and conditioned to be responsive to an increase in the number of such channels, and circuitry connected to be activated by the responses of either of the next preceding two means to produce a signal to initiate generation of the sawtooth voltage.

3. A unit as set forth in claim 1, also including means to produce a voltage proportional to the number of active range channels, means connected to receive the proportional voltage, which last-mentioned means comprehends individual electrically conducting devices equal in number to the total number of channels, each device being conditioned to respond to a respective level of the proportional voltage corresponding to an assigned number of active channels so that the number of devices conducting at any time is equal to the number of active channels, a respective relay connected to be closed by current through each device, means connecting each relay to a voltage supply, means connecting each relay to a respective order register, the relay connected to the device that conducts at a signal level of one active channel being connected to the first order register, the relay connected to the device that conducts at a signal level of two active channels being connected to the second order register, and so on through the series, the contacts of the relays being so connected that when the relay is not energized it applies the supply voltage to its respectively connected order register to move that register to and hold it in zero position, but when energized that voltage is withheld from the order register so the register is free to respond to a pulse derived from a range voltage signal.

4. A component as defined in claim 3 including further means conditioned to derive a signal whenever a said first tube is cut off and to apply the thus-derived signal to all said electrically conducting devices to render all these devices conducting and so to withdraw momentarily from all the order registers the said zeroing supply voltage.

5. In an aircraft landing signal system, a unit for determining the order of landing of several aircraft to each of which is assigned a range signal channel, comprising respective means responsive to the range signal in each channel, the signals each having strength proportional to the distance of the aircraft represented by such signal, means to extinguish cyclically the response of each first-mentioned means in the order of increasing signal strength thereon, means to derive a pulse from each channel as the signal is extinguished, individual means to receive and record the pulse from each channel, and means to direct to the same pulse-recording means the pulse resulting from the first-extinguished channel, to another same pulse-recording means the pulse from the second-extinguished channel, and so on, regardless of which specific channel may be first- or second-extinguished, and so on, in each cycle.

6. A unit as set forth in claim 5 that further includes means to generate a sawtooth voltage and means to apply that voltage to extinguish cyclically the response to the range signals.

7. A unit as set forth in claim 6 that comprises also means responsive to a change in the number of channels carrying range signals to initiate generation of the sawtooth voltage.

8. A unit as set forth in claim 5 that further comprises means to return to zero position any pulse-recording means when it is not functioning to record a pulse.

9. In a system for controlling a plurality of aircraft, the combination comprising: a separate channel corresponding to each aircraft, each channel being adapted to produce an output signal in accordance with the position of each corresponding aircraft, all of said channels being operable to produce signals having a predetermined common range of values, whereby any channel may be assigned to any aircraft having a position falling within a corresponding range of positions; means including a cathode-ray tube responsive to the output signals of said channels for producing position indications corresponding to the relative positions of all of said aircraft, each position indication not only corresponding to a particular aircraft, but also thereby corresponding to a channel assigned thereto; means also responsive to said channel output signals for producing additional indications identifying said channels in positions spaced apart in a predetermined direction and in the same order as the order of appearance of respective corresponding position indications on said cathode-ray tube; and circuit controlling means identifiable with each of said channels to effect communication with each corresponding aircraft.

10. In a track-while-scan landing system for controlling the descent of a plurality of aircraft along an ideal glidepath, said system having a channel for each of said aircraft to track the range of each and an indicator for producing a visual representation of the range of each of said aircraft, an arrangement to monitor simultaneously the descent of all of said aircraft, said arrangement comprising: a bank of sensible means actuable to indicate visually the identity of said tracking channel in the landing order of aircraft assigned thereto, said sensible means being arranged in an equal number of rows and columns representing the identity and landing order of said assigned aircraft, respectively; and at least one manually operable switch disposed in visual correspondence to each row of said sensible means to effect a change in guidance of selected aircraft, whereby a hazard detected on said indicator and caused by a dangerous maneuver of an aircraft may be expeditiously removed firstly by comparing the landing order of said hazard aircraft as it appears on said indicator with the representation of said sensible means to determine the range tracking channel corresponding to said hazard aircraft, and subsequently by manually actuating the switch corresponding to said hazard aircraft to effect a change in the guidance thereof.

11. A device responsive to a plurality of input signals for producing a plurality of corresponding identification signals successively in an order corresponding to the magnitudes of a common variable characteristic of said input signals, said device comprising: means for generating a comparison signal having said common characteristic changing from one to the other of two predetermined limits, means for generating an identification signal for each of said input signals each time said common characteristic of said comparison signal becomes equal to that of each of said input signals, a plurality of order registers, and means for introducing the first identification signal generated only to a first order register, a second identification signal generated only to a second order register, etc., regardless of which specific identification signal is generated first.

12. A unit for registering the identities of a plurality of input signals in the order of their magnitude, said unit comprising: means for generating a comparison signal changing in amplitude from one to the other of the extreme variable limits of the input signals, means for generating an identification signal corresponding to each of the input signals each time said comparison signal becomes substantially equal in amplitude to each corresponding input signal, a plurality of order registers, and means for introducing the first identification signal generated only to a first order register, a second identification signal generated only to a second order register, etc., regardless of which specific identification signal is generated first.

13. The invention as defined in claim 12, wherein additional means are provided to display visually the identities of the input signals in the order in which their corresponding identification signals are generated.

14. A unit for registering the identities of a plurality of input signals in the order of their magnitude, said unit comprising: means for generating an initiating signal each time a different number of input signals are produced; means for generating a comparison signal each time said initiating signal is generated, said comparison signal changing in amplitude from one to the other of the extreme variable limits of the input signals, means for generating an identification signal corresponding to each of the input signals each time said comparison signal becomes equal in amplitude to each corresponding input signal; a plurality of order registers, and means for introducing the first identification signal generated only to a first order register, a second identification signal generated only to a second order register, etc., regardless of which specific identification signal is generated first.

15. In a system for rearranging the identities of a plurality of input signals in order of their magnitude, a unit for operating a plurality of order registering devices, said unit comprising: means for generating a comparison signal change in amplitude from one to the other of the extreme variable limits of the input signals, means for generating an identification signal corresponding to each of the input signals each time said comparison signal becomes equal in amplitude to each corresponding signal, means for impressing all of said identification signals on all of said registering devices, and means for rendering a different one of said registering devices operative in a selected order as each identification signal is generated, said selected order being the same order each time said comparison signal is generated.

16. In a system for rearranging the identities of a plurality of input signals in the order of their magnitudes, the combination comprising: means for generating identification signals corresponding to each of the input signals in the order of their amplitudes and at a time when their amplitudes are larger than a predetermined minimum value, a plurality of order registers, and means for introducing the first identification signal generated only to a first order register, a second identification signal generated only to a second order register, etc., regardless of which specific identification signal is generated first.

17. In a system for rearranging the identities of a plurality of input signals in the order of their magnitudes, the combination comprising: means for generating a comparison signal changing in amplitude from one to the other of the extreme variable limits of the input signals, second means for generating an identification signal corresponding to each input signal as said comparison signal becomes substantially equal in amplitude to each input signal, a plurality of order registers, and third means for introducing the first identification signal generated only to a first order register, a second identification signal generated only to a second order register, etc., regardless of which specific identification signal is generated first.

18. The invention as defined in claim 16, wherein said comparison signal is a sawtooth voltage.

19. The invention as defined in claim 16, wherein comparison signal is generated each time a different number of input signals are produced.

20. The invention as defined in claim 19, wherein means are additionally provided to remove the identities contained in all of said order registers in excess of the number of input signals produced.

21. The invention as defined in claim 17, said second means including a trigger circuit for and responsive to each input signal to impress all of said identification signals on each of said order registers, said third means including a master order selector having means actuable in response to the generation of said identification signals to provide selectively return paths for said identification signals through only a first order register upon the generation of a first identification signal, through only a second order register upon the generation of a second identification signal, etc.

22. The invention as defined in claim 21, including means for setting said master order selector to provide a return path for the first identification signal generated from only said first order register, each time a different number of input signals are produced.

23. The invention as defined in claim 21, wherein means are additionally provided to remove the identities contained in all of said order registers in excess of the number of the input signals.

24. In a track-while-scan landing system for controlling the descent of a plurality of aircraft along an ideal glide-path, said system including a channel for each of said aircraft to track the range of each, an arrangement to monitor simultaneously the descent of all of said aircraft, said arrangement comprising: an indicator for producing a visual representation of the range of each of said aircraft substantially simultaneously in the same viewing area, sensible means for producing visual representations identifying said range representations with corresponding ones of said channels, said sensible means thereby being visually portrayed in the landing order of aircraft corresponding thereto, and at least one manually operable switch identifiable with each of said channels to effect a change in guidance of a selected aircraft.

25. In a system for controlling a plurality of aircraft, the combination comprising: a separate channel corresponding to each aircraft, each channel being adapted to produce an output signal in accordance with the position of each corresponding aircraft, all of said channels being operable to produce signals having a predetermined common range of values, whereby any channel may be assigned to any aircraft having a position falling within a corresponding range of positions; means including a cathode-ray tube responsive to the output signals of said channels for producing position indications corresponding to the relative positions of all of said aircraft; means also responsive to said channel output signals for producing indications to identify said channels in positions spaced apart in a predetermined direction in the same corresponding spacial order of said position indications displayed on said cathode-ray tube in accordance with said channel output signals; and a switch identifiable with each of said channels to effect a change in guidance of a corresponding selected aircraft.

References Cited in the file of this patent

UNITED STATES PATENTS

| | | |
|---|---|---|
| 1,929,402 | Belliveau | Oct. 10, 1933 |
| 2,363,416 | Henroteau | Nov. 21, 1944 |
| 2,391,469 | Marshall | Dec. 25, 1945 |
| 2,439,948 | Preston | Apr. 20, 1948 |
| 2,477,395 | Sunstein | July 26, 1949 |
| 2,509,850 | Von Mulinen | May 30, 1950 |
| 2,535,162 | Rodgers | Dec. 26, 1950 |
| 2,559,622 | Hildyard | July 10, 1951 |
| 2,642,527 | Kelly | June 16, 1953 |
| 2,674,732 | Robbins | Apr. 6, 1954 |
| 2,715,181 | Glenn | Aug. 9, 1955 |

UNITED STATES PATENT OFFICE

CERTIFICATE OF CORRECTION

Patent No. 2,932,812

April 12, 1960

William T. O'Neil

It is hereby certified that error appears in the printed specification of the above numbered patent requiring correction and that the said Letters Patent should read as corrected below.

Column 1, line 55, after "producing" insert -- a --; column 2, line 12, after "from" insert -- the --; line 13, after "by" insert -- a --; column 4, line 37, for "the lamp" read -- one lamp --; line 42, for "push-buttons" read -- pushbuttons --; line 74, strike out "that"; column 5, line 56, after "drops" insert a comma; column 7, line 17, before "wipe" insert -- are positioned on --; line 18, strike out "portion"; line 21, after "supply" insert a comma; column 8, line 11, after "applied" insert a comma; line 47, after "executed" insert a comma; column 9, line 54, for "values of capacitance" read -- sizes of capacitor --; column 10, line 12, for "triode 106" read -- pentode 107 --; line 22, for "17" read --117 --; column 12, line 38, after "channels" insert a comma; line 46, strike out "as a cathode follower"; line 62, after "pulse" insert a comma; line 70, for "is" read -- are --; column 13, line 7, after "channel" insert a comma; line 8, after "energized" insert a comma; line 9, for "is" read -- are --; line 15, after "charged" insert a period; same line, strike out "and"; line 16, for "after" read -- After --; same column 13, line 25, for "165 this" read -- 165. This --; line 37, after "closes" insert -- the --; line 48, for "volts removed" read -- volts are removed, --; line 49, after "194" insert a comma; column 14, line 52, for "modulator" read -- modulated --; column 17, line 53, for "change" read -- changing --.

Signed and sealed this 8th day of November 1960.

(SEAL)
Attest:
KARL H. AXLINE
Attesting Officer

ROBERT C. WATSON
Commissioner of Patents